Nov. 2, 1926.
W. R. NIMMO ET AL
1,605,136
MOTOR PROTECTIVE DEVICE
Filed Feb. 8, 1923
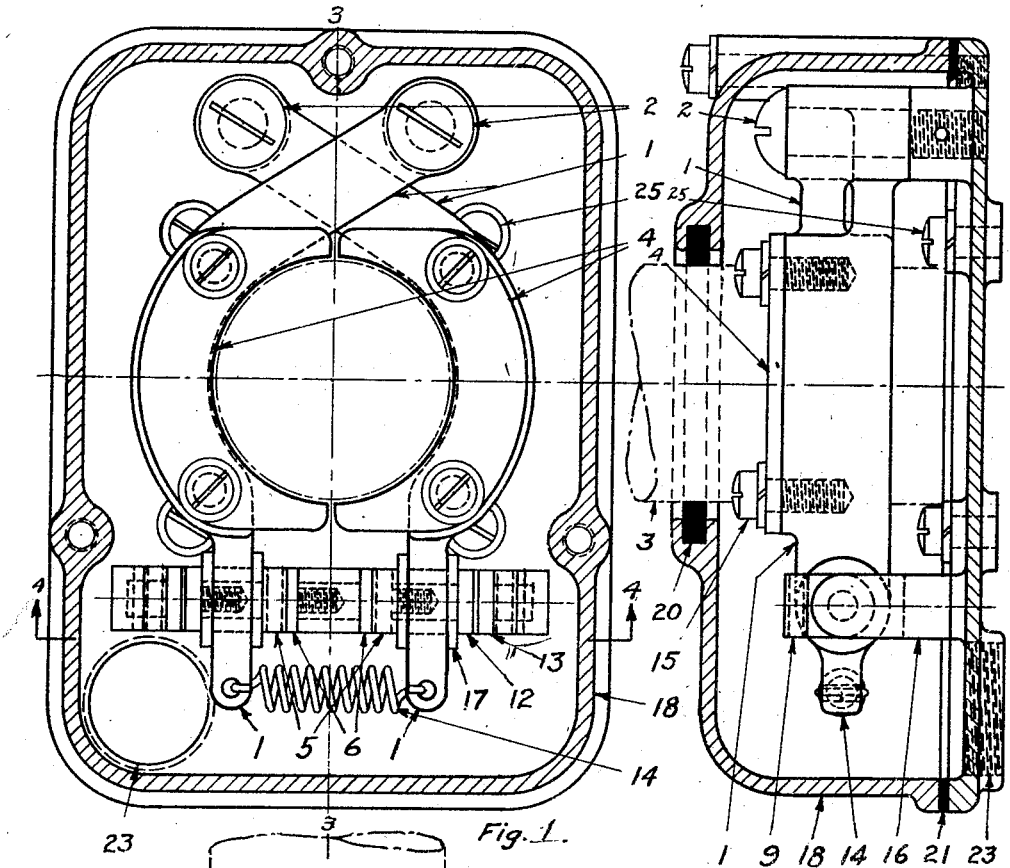
Fig. 1.
Fig. 2.
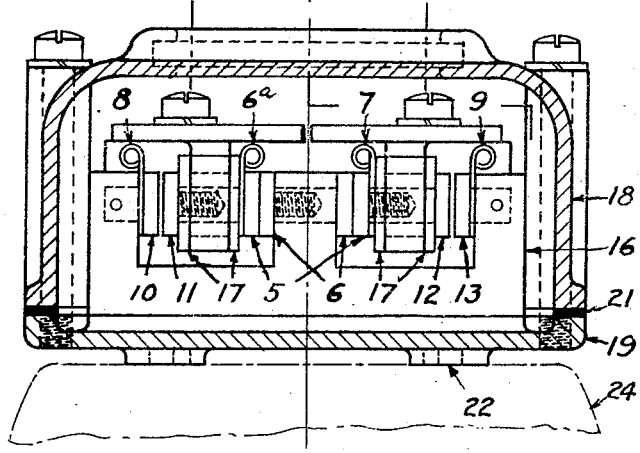
Fig. 3.
Inventors
William Ross Nimmo and
William S. Tull
Atty.

Patented Nov. 2, 1926.

1,605,136

UNITED STATES PATENT OFFICE.

WILLIAM ROSS NIMMO, OF BELLEVUE, AND WILLIAM S. TULL, OF JACKSON, MICHIGAN.

MOTOR PROTECTIVE DEVICE.

Application filed February 8, 1923. Serial No. 617,874.

The invention relates to a motor protective device.

The object of the present invention is to provide a safety device of simple, practical and comparatively inexpensive construction having for its purpose the protection of electric motors against burn-outs.

It is well known that a very large percentage of the burn-outs in motors is occasioned by either short circuits or grounds in either the stationary part or stator or the moving part or rotor caused by the action of the rotor when it comes in contact with the stationary part or stator, due primarily to the wearing or heating of one or both of the bearings of the motor, which allows the rotor to move radially because of the forces acting on the motor shaft pulley or gear through the belt or other transmitting medium.

A further object of the invention is to provide a safety device of this character designed to be connected in the tripping circuit of an electric motor whether alternating or direct current and adapted to be operated by radial movement of the shaft at such time during the period of this radial movement that the air gap between the rotor and stator has attained a minimum dimension considered safe for operating and capable of opening or closing a set of electrical contacts connected in the tripping circuit of the circuit breaker or switch and thereby cause the circuit breaker or switch to open and cut the motor off from its source of supply and stop the motor before any damage is done to its coils or other parts.

A further object of the invention is to provide a circuit maker and breaker adapted to be positively and mechanically actuated by radial movement of a shaft whether the same be rotating or not for closing a circuit independent of the motor and its circuits to operate a circuit breaker controlling the feed of the current to the motor, whereby the motor will be stopped by such radial movement of the shaft and will be maintained out of operation until the defect permitting such radial movement of the shaft is repaired and the shaft reset or returned to its proper operative position.

A further object of the invention is to provide a protective device adapted to be mounted either interiorly or exteriorly of the motor bearing S and to have the motor shaft extend through it so as to be operated by the motor shaft when the same moves in a radial direction through the aforesaid causes a distance liable to cause damage to the motor.

With these and other objects in view the invention consists in the novel construction, combination and arrangement of parts hereinafter fully described, illustrated in the accompanying drawings and pointed out in the claims hereto appended, it being understood that various changes in the form, proportion and minor details of construction within the scope of the appended claims may be resorted to without departing from the spirit or sacrificing any of the advantages of the invention.

In the drawings in which like characters of reference designate corresponding parts in the several views:

Figure 1 is an enlarged vertical sectional view of the protective device taken transversely of the motor shaft.

Figure 2 is a vertical sectional view taken substantially on the line 3—3 of Figure 1.

Figure 3 is a horizontal sectional view taken substantially on the line 4—4, Figure 1.

In the accompanying drawings is illustrated one embodiment of the invention in which the protective device A is arranged exteriorly of the motor bearings. The device comprises in its construction a pair of movable arms 1 pivoted at their upper ends on pins or screws 2 and having curved lower portions located at opposite sides of the motor shaft 3. The arms have approximately straight upper portions arranged at an inclination and crossing each other centrally above the motor shaft while the lower portions of the arms are arranged in spaced relation and are substantially parallel and are connected by a tension spring 14 which normally maintains the arms in closed position. The tension spring is of helical form and extends across the space between the lower ends of the pivoted arms and is suitably secured to the same as clearly illustrated in Figure 2 of the drawings.

The lower curved portions of the pivoted arms substantially encircle the motor shaft 3 and are equipped with adaptors 4 consisting of curved plates adjustably secured to the pivoted arms by screws 15, the holes in the plates being of sufficient size to permit an adjustment of the plates toward and from the motor shaft to arrange the same in proper position with relation to the said shaft for affording the desired clearance when the shaft is in proper position with relation to the stationary part of the motor. The plates are constructed of such size as is required by the particular motor shaft and in practice the adaptors will be adjusted by the use of suitable thickness gauges. The plates are designed to be constructed of a hard metal such as steel similar to that of which motor shafts are constructed, and the said plates must be constructed and adjusted so that the motor shaft will contact with and move one of them and trip the circuit breaker before the rotor of the motor comes in contact with the stationary part or stator. The lower spaced portions of the pivoted arms have mounted on them at their inner sides movable contacts 5 which coact with stationary contacts 6, while movable contacts 11 and 12 are mounted on the lower portions of the said pivoted arms at the outer sides thereof to coact with stationary contacts 10 and 13. The contacts 5 and 6 are normally in engagement with each other while the contacts 10 and 11, and 12 and 13 are normally arranged in spaced relation with each other. The radial movement of the motor shaft will cause one of the contacts 5 to move away from the adjacent contact 6 and thereby open the tripping circuit of the circuit breaker in the case of an under voltage trip, and trip the circuit breaker, these contacts being connected in the circuit through the connecting terminals 6ª and 7. In the case of a motor fed through a circuit breaker which is tripped by a circuit closing device, this can be accomplished by connecting the terminals 8 and 9 in the tripping circuit along with the terminals 6ª and 7. With these connections, the tripping circuit is closed through the contacts 10 and 11 or 12 and 13. Thus it will be seen that the device may be used either as a circuit opening or a circuit closing device as required. The stationary contacts 6, 10 and 13 are mounted on an insulating block 16 while the movable contacts 5, 11 and 12 are supported on the movable arms, being insulated therefrom by insulating bushings 17.

The operating parts of the device are enclosed in a metallic case 18 having a fixed back plate 19, and equipped with gaskets 20, 21 and 22, which render the metal case dust proof. The electrical connections are made through a suitable conduit which is screwed into a tapped hole 23. The device is mounted with the motor shaft 3 projecting through and between the movable arms 1 and the metallic case is mounted on a suitable stationary object such as the bearing housing 24 of the motor by screws 25 which pierce the back plate 19 and which are equipped with the gasket 22.

While but one form of the invention is illustrated in the accompanying drawings, it will be apparent that it may take other forms as may be required by different applications of the invention. As for example, the electrical contacts may be mounted separately from the rest of the device in a separate housing and remotely controlled by a rod or other means extending from the movable arms 1. The device shall, however, be substantially the same in principle or mode of operation, namely, a set of electrical contacts for tripping the circuit breaker and operated by a pair of movable arms actuated by radial movement of the motor shaft.

The motor protective device will prevent at least fifty percent of all motor burn-outs The device may be advantageously employed for protecting other rotating apparatus, such as fans, turbines and the like which are electrically or otherwise propelled through a belt or other type of transmission, and which embody a bearing liable to wear and thus allow the rotating element to be forced in a radial direction out of its proper position. The protecting device may be arranged to operate to shut off the power from a fan or turbine or other apparatus before the rotor touches the stationary part and causes serious damage to the apparatus. In this manner various devices may be protected and stopped before injury can result from such radial movement.

What I claim is:

1. A circuit maker and breaker for inclusion in a tripping circuit for the protection of motors including a pair of curved arms adapted to substantially encircle a motor shaft and pivoted at one end and movable inwardly and outwardly, yieldable means for normally maintaining the curved arms at the limit of their inward movement and circuit controlling means associated with the curved arms and actuated by the outward movement of the same for operating a circuit breaker or circuit switch.

2. A circuit maker and breaker for inclusion in a tripping circuit for the protection of motors including a pair of curved arms having crossed upper portions pivotally mounted, said arms having portions arranged to permit a motor shaft to pass between them and to be positively and mechanically actuated by radial movement of the motor shaft and the said arms being also provided with dependently substantially straight lower terminal portions, a spring connecting the lower terminal portions for maintaining the arms normally closed, fixed and movable contacts located at the inner and outer sides of the straight depending terminal portions of the said arms, the movable contacts being arranged to be actuated by the arms and closing a circuit for operating a circuit breaker or switch.

In testimony whereof we have hereunto set our hands.

WILLIAM ROSS NIMMO.
WILLIAM S. TULL.